(12) United States Patent
Hochstetter

(10) Patent No.: US 12,350,895 B2
(45) Date of Patent: Jul. 8, 2025

(54) METHOD FOR MANUFACTURING A PART MADE OF COMPOSITE MATERIAL USING A THIN-WALLED MOLD

(71) Applicant: Arkema France, Colombes (FR)

(72) Inventor: Gilles Hochstetter, Colombes (FR)

(73) Assignee: ARKEMA FRANCE, Puteaux-la Défense (FR)

( * ) Notice: Subject to any disclaimer, the term of this patent is extended or adjusted under 35 U.S.C. 154(b) by 51 days.

(21) Appl. No.: 17/628,925

(22) PCT Filed: Jul. 22, 2020

(86) PCT No.: PCT/FR2020/051340
§ 371 (c)(1),
(2) Date: Jan. 21, 2022

(87) PCT Pub. No.: WO2021/014100
PCT Pub. Date: Jan. 28, 2021

(65) Prior Publication Data
US 2022/0258439 A1    Aug. 18, 2022

(30) Foreign Application Priority Data

Jul. 22, 2019  (FR) ...................................... 1908297

(51) Int. Cl.
*B29C 70/48*       (2006.01)
*B29C 70/54*       (2006.01)
*B29K 101/12*      (2006.01)

(52) U.S. Cl.
CPC .............. *B29C 70/48* (2013.01); *B29C 70/54* (2013.01); *B29K 2101/12* (2013.01)

(58) Field of Classification Search
CPC .......... B29C 70/46; B29C 70/54; B29C 70/48
See application file for complete search history.

(56) References Cited

U.S. PATENT DOCUMENTS 2,705,227 A   3/1955  Stoeff
4,952,366 A   8/1990  Gelin
(Continued)

FOREIGN PATENT DOCUMENTS

CN   1266771 A   9/2000
CN   1652919 A   8/2005
(Continued)

OTHER PUBLICATIONS

Bigg, D.M., Thermally conductive polymer compositions, Polymer Composites, vol. 7, No. 3 (1986), pp. 125-140. (Year: 1986).*
(Continued)

*Primary Examiner* — Matthew J Daniels
(74) *Attorney, Agent, or Firm* — Boone IP Law

(57) ABSTRACT

A thin-walled mold and a method for manufacturing a part made of composite material, the material including reinforcing fibers and a polymer matrix, the method including the following consecutive steps: installing, in a matrix mounted on a press, a closed thin-walled mold in which reinforcing fibers have been arranged; closing the press; injecting a polymer or a reactive composition including at least one prepolymer, at least one monomer or a mixture thereof, in the molten state, into the closed thin-walled mold; keeping the press closed during all or part of the polymerisation of the polymer matrix when a reactive composition is used; opening the press and removing the thin-walled mold from the press, while maintaining a residual pressure of between 0.7 and 10 bar, preferably between 0.7 and 5 bar, inside the mold; and cooling the mold under said residual pressure.

11 Claims, 2 Drawing Sheets

(56) References Cited

U.S. PATENT DOCUMENTS

| | | | | |
|---|---|---|---|---|
| 5,134,002 | A | * | 7/1992 | Vallier .................. B29C 70/443 |
| | | | | 428/36.1 |
| 5,600,091 | A | * | 2/1997 | Rose .................... H05K 9/0015 |
| | | | | 174/374 |
| 2003/0214077 | A1 | | 11/2003 | Unterlander et al. |
| 2005/0042324 | A1 | | 2/2005 | Unterlander et al. |
| 2007/0063378 | A1 | * | 3/2007 | O'Donoghue .......... B29C 33/40 |
| | | | | 425/406 |
| 2008/0146717 | A1 | | 6/2008 | Gijsman et al. |
| 2008/0274355 | A1 | | 11/2008 | Hewel |
| 2015/0258742 | A1 | | 9/2015 | Hochstetter |
| 2015/0285742 | A1 | | 10/2015 | Frank |

FOREIGN PATENT DOCUMENTS

| | | |
|---|---|---|
| CN | 107530985 A | 1/2018 |
| CN | 108025475 A | 5/2018 |
| EP | 3357666 A1 | 8/2018 |
| JP | 55-030901 A | 3/1980 |
| JP | 57-022034 A | 2/1982 |
| JP | 03-099815 A | 4/1991 |
| JP | 06-047754 A | 2/1994 |
| JP | 2005-271551 A | 10/2005 |
| JP | 2006-501080 A | 1/2006 |
| JP | 2013-086151 A | 5/2013 |
| WO | 2014064375 A1 | 5/2014 |
| WO | 2014064377 A1 | 5/2014 |
| WO | 2017/056614 A1 | 4/2017 |

OTHER PUBLICATIONS

Chinese Official Action in corresponding Chinese Application No. 202080052957.4 mailed on Jun. 24, 2023, with English-language translation (28 Pages).

French Search Report issued in corresponding French Patent Application No. 1908297 dated Apr. 29, 2020. (9 pages).

International Search Report (PCT/ISA/210) and Written Opinion (PCT/ISA/237) mailed on Oct. 23, 2020, by the European Patent Office as the International Searching Authority for International Application No. PCT/FR2020/051340. (14 pages).

Office Action received for Japanese Patent Application No. 2022-504224, mailed on May 21, 2024, 13 pages (6 pages of English Translation and 7 pages of Original Document).

* cited by examiner

[Fig. 1]
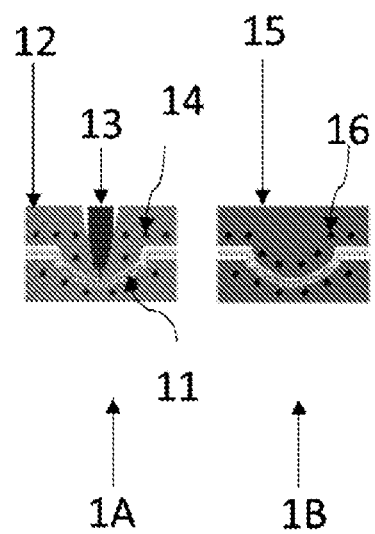
[Fig. 2]
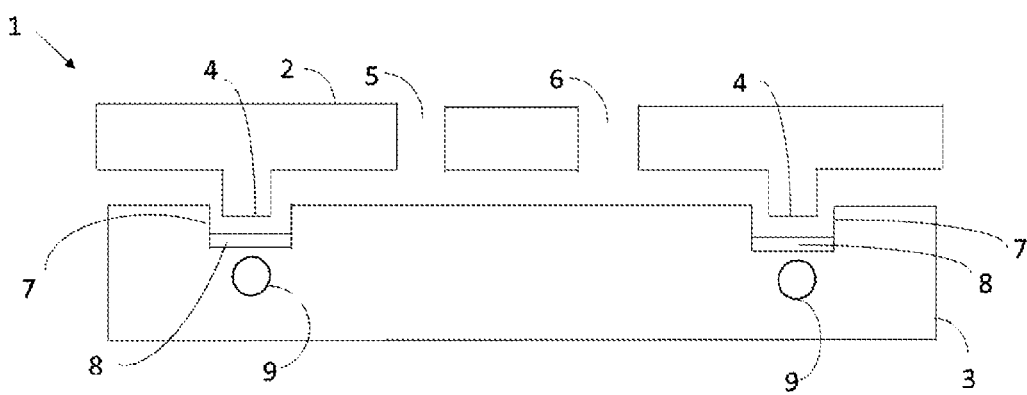

[Fig. 3]
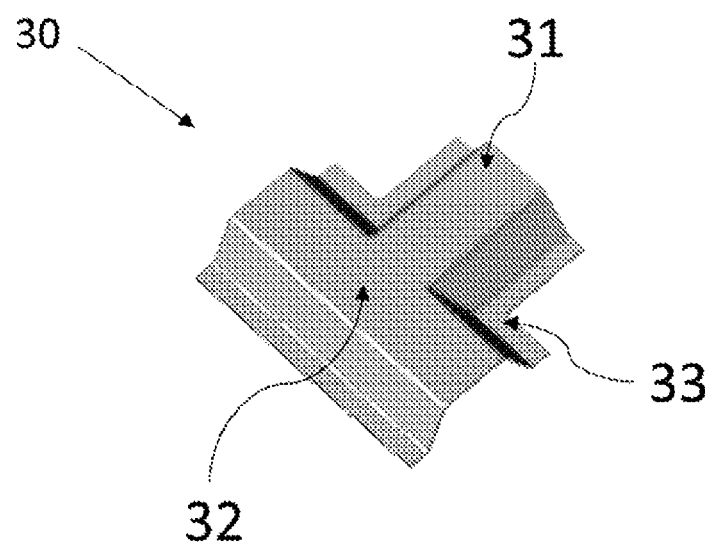

METHOD FOR MANUFACTURING A PART MADE OF COMPOSITE MATERIAL USING A THIN-WALLED MOLD

FIELD OF THE INVENTION

The present invention relates to a method for manufacturing a part made of reinforced composite material with molding fibers from a reactive composition, this method implementing a thin-walled mold. The invention also relates to the thin-walled mold and its use for manufacturing a composite material.

STATE-OF-THE-ART

It is known to manufacture composite material products by molding. The molding methods by resin transfer or "Resin Transfer Molding", known as RTM, and compression resin transfer molding methods, known as CRTM, also called ICM (Injection Compression Molding) are generally used. These methods use a temperature-controlled press. Generally, this type of molding method is isothermal. This is especially the case with thermosetting resins. However, in the case of thermoplastic resins, it may be advantageous to use an anisothermal method, to facilitate the impregnation of fibers by reducing the viscosity of the reactive composition or of the polymer used to impregnate the fibers. In the case of a reactive method, an anisothermal cycle is also useful to accelerate the polymerization kinetics by increasing the temperature of the molding method. The reinforcing fibers are then arranged in the mold of the press. This mold is closed, then brought up to temperature, if it was not previously heated. The polymer or the reactive composition based on the precursor(s) of this polymer is injected in the molten state into the mold. Next, the temperature of the mold is lowered by cooling. Then, the part obtained is removed from the mold. Thus, the press is equipped with a heating system, generally using electrical resistors or a hot fluid system and a cooling system, generally using cold water or compressed air circuits.

It is possible to inject a composition of monomers or even prepolymers. It may be advantageous to use a reactive composition with a base of one or several prepolymers having sufficient weight. Sufficient weight means that their weight makes it possible to reduce the polymerization time required to achieve the weight of the final polymer or to reduce the quantity of polymerization sub-products, when the chain elongation chemistry used releases polymerization sub-products. The prepolymers can be semi-crystalline and when their molar mass is sufficiently high, their melting temperature is greater than the crystallization temperature of the final polymer. The prepolymers can be amorphous and when their molar mass is sufficiently high, their implementation temperature is greater than the glass transition temperature of the final polymer. In these particular cases, it will be necessary to perform thermal cycling so as to cool the composite below the injection temperature of the polymer or of the reactive composition in order to be able to remove it from the mold. For example, in the case of polyamides, the polymerization can be carried out by polycondensation. The kinetics of this polymerization are relatively slow, and the polymerization times close to one minute are only encountered at temperatures greater than 250° C.

Thus, it is sometimes necessary to also perform an anisothermal molding cycle in order to be able to polymerize rapidly, and especially above 250° C., at least above the melting temperature, denoted by Tm, the precursor(s) of the reactive mixture, when they are semi-crystalline and above their glass transition temperature denoted by Tg when they are amorphous, then to cool the mold in order to be able to remove the part from the mold, at a temperature below the crystallization temperature denoted by Tc for semi-crystalline polymers or Tg for amorphous polymers.

There is a real need to shorten the duration of these molding methods, in order to increase the production rates. Thus, one of the intended purposes is to shorten the duration of the heating step of the mold and to shorten the duration of the cooling step of the mold. A molding cycle of the order of one minute is particularly sought after.

Thus, there is also a real need to reduce the energy cost of this type of method.

It is possible to resolve this problem by increasing the number of heating circuits and the number of cooling channels within the press. However, replacing the old press with new more sophisticated presses represents a significant cost. In addition, this solution does not resolve the problem of the high energy cost of this method.

Furthermore, it is important to obtain molded parts of good quality, that is having a composition that is homogeneous.

DESCRIPTION OF THE INVENTION

This technical problem is resolved by the use of a removable mold comprising thin walls. The method for manufacturing a part made of composite material, said material comprising reinforcing fibers and a polymer matrix, the method comprising the following successive steps:
- installation in a matrix fitted on a press of a closed thin-walled mold in which reinforcing fibers have been arranged,
- closing of the press,
- injection in the molten state in the closed thin-walled mold of a polymer or a reactive composition comprising at least one prepolymer, at least one monomer or their mixture,
- maintaining the closing of the press for all or part of the polymerization of the polymer matrix, when a reactive composition is used,
- opening of the press
- removal of the thin-walled mold from the press, while maintaining a residual pressure between 0.7 and 10 bar, preferably between 0.7 and 5 bar, in said mold,
- cooling of the mold under said residual pressure.

The method according to the invention has the advantage of reducing the energy cost of the manufacturing. As the cooling step is carried out outside the press, the matrix fitted on the press can remain at a constant temperature. The press used according to the method according to the invention no longer undergoes temperature increases and decreases. Further, the production cycle time, which corresponds to the time spent in the press, can be significantly reduced, as part of the polymerization, then cooling occurs in masked time, outside the press. In addition, the parts produced by this method present a composition, and especially a crystallinity, which is identical across the entire part.

The invention also relates to the thin-walled mold implemented in the method according to the invention and to its use for the manufacturing of composite material.

BRIEF DESCRIPTION OF THE FIGURES

FIG. 1 is a diagram of certain steps of the method according to the invention.

FIG. 2 is a cross sectional view of a thin-walled mold according to the invention.

FIG. 3 is a perspective view of a molded part according to the examples.

DESCRIPTION OF EMBODIMENTS OF THE INVENTION

Other characteristics, features, subjects and benefits of the present invention will appear even more clearly after reading the description that follows.

It is further indicated that the expressions "between . . . and . . . " and "from . . . to . . . " used in the present description must be understood as including each of the indicated limits.

The invention will now be described in more detail, in a non-limiting fashion, in the following description.

The method according to the invention implements a thin-walled mold. By thin-walled mold, one understands in the context of the present invention a mold comprising two complementary shapes. The thickness of the walls is such that the mold withstands a residual molding pressure greater than the saturated vapor pressure of water at the injection temperature of the reactive composition.

Steps of the Method

The method according to the invention comprises a step of installing in a matrix mounted on a press a thin-walled mold in a closed position, in which reinforcing fibers are arranged. Then, the press is closed over this mold. The press is maintained in the closed position for sufficient time, so that the mold is heated to a temperature of the matrix fitted on the press. Generally, the duration of the temperature increase of the mold is short, as the mold is designed such that the contact with the matrix fitted on the press quickly imparts its temperature to the thin walls of the mold. The reactive composition or the polymer is then injected in the mold. The press is maintained in the closed position, to enable the polymer matrix to impregnate the reinforcing fibers. In the case of the use of a reactive composition, all or part of the polymerization may also be carried out during the time in which the thin-walled mold is maintained in the press. In this case, the duration of this step is dependent on the reactive composition used. The press is then opened to enable the mold to be released. After removal from the press, the mold is left to cool before the demolding step.

Each of the steps of the method will be disclosed in detail hereinafter.

Fitting of Reinforcing Fibers

The reinforcing fibers can either be arranged in the thin-walled mold by a simple deposition action, or arranged in the form of a preform.

According to a particular embodiment of the invention, the reinforcing fibers can be fashioned in the form of preform. The reinforcing fibers are then mixed with an adhesion resin, otherwise known as a preform binder, then molded, optionally by compression in a suitable mold or even directly in the thin-walled mold according to the invention, in order to produce a preform. This latter presents the advantage of being easier to manipulate. This preform can then be easily arranged in the thin-walled mold, if it is not already in it.

Depending on the reinforcing fibers used and the nature of the polymer or of the reactive composition used for molding, the preforming step can be carried out at a temperature between 80° C. and 320° C. The preform binder is selected in order to withstand the injection temperature applied.

This optional preforming step can be carried out on a circular device arranged on an axis of rotation. Preferably, the rotation axis of the circular device is parallel to that of the press. The circular device can be arranged in the vicinity of the press. For example, a carousel can be used.

According to a particular embodiment of the invention, a robotic arm can be used to arrange the preform in the thin-walled mold, when this has been carried out in another mold.

Throughout the molding method, that is from the installation of the mold in the press through to demolding, the thin-walled mold is maintained in the closed position.

This retention in the closed position may be carried out either by a vacuum filling system, or by a conventional mechanical closing system.

Preferably, the thin-walled mold is equipped with a vacuum filling system, which exerts a residual pressure between 0.7 and 10 bar, preferably between 0.7 and 5 bar. Advantageously, said residual pressure is 0.7 to 0.9 bar.

Advantageously, when the residual pressure is 0.7 to 0.9 bar, the polymerization is carried out by polyaddition or by radical polymerization or by nucleophilic substitution.

Advantageously, when the thin-walled mold comprises a mechanical closing system, then said residual pressure is 0.9 to 10 bar, preferentially from 0.9 to 5 bar.

Optional Preliminary Step of Degassing Before Installing the Mold in the Press

The method according to the invention can comprise a degassing step in the thin-walled mold, before the step of installing the mold in the press. This makes it possible to keep the thin-walled mold closed during its transfer under the press. This also makes it possible to eliminate in the thin-walled mold all or some of the air and/or any other substance, the presence of which may be detrimental to the manufacturing of the composite material part. In fact, degassing of the fibers in the closed thin-walled mold, carried out prior to beginning injection of the polymer or reactive composition, makes it possible to reduce the porosities linked to air bubbles.

According to a particular embodiment of the invention, the thin-walled mold is provided with a degassing system, that is a gas extraction system present in the enclosure of the mold, comprising at least one pump and one or several vents. In the case of the use of a polymerizing chemical system by polycondensation, the vacuum filling system is then closed to enable the polymer or the reactive composition to be injected under the conditions limiting polymerization. This is also the case when the polymer or the reactive composition is fluid enough at the injection temperature to risk being introduced into the vents of the mold used for degassing and blocking them.

The degassing may be carried out with a vacuum ranging from 0.010 to 0.950 bar, preferably from 0.700 to 0.900 bar, with respect to the atmospheric pressure.

Installation of the Thin-Walled Mold into the Press

The method comprises a step for installing in the matrix fitted on the press a closed thin-walled mold in which reinforcing fibers have been arranged.

According to another particular embodiment of the invention, a robotic arm can be used to arrange the thin-walled mold in the matrix of the molding press. The combination of a carousel and a robotic arm is also possible.

Closing of the Press

Then, once the thin-walled mold is arranged in the matrix of the press, this latter is closed. The press is maintained in the closed position for a sufficient period of time so that the matrix of the press imparts its temperature to the walls of the mold. The thickness of the thin walls of the mold is such that the thermal conduction between the matrix of the press and the walls of the mold is high.

Optional Preliminary Step of Degassing after Installing the Mold into the Press

The method according to the invention can comprise a degassing step in the thin-walled mold, before the injection step. The application of this degassing makes it possible to eliminate in the thin-walled mold all or some of the air and/or any other substance, the presence of which may be detrimental to the manufacture of the composite material part. In fact, degassing of the fibers in the closed thin-walled mold, carried out prior to beginning injection of the polymer or reactive composition, makes it possible to reduce the porosities linked to air bubbles. The thin-walled mold is, preferably, equipped with a vacuum filling system making it possible to perform this degassing. After degassing of the mold, the vacuum filling system is closed to enable the polymer or the reactive composition to be injected.

Injecting the Polymer or the Reactive Composition

Then, the method according to the invention comprises a step for injecting in the molten state into the closed thin-walled mold a polymer or a reactive composition comprising at least one prepolymer, at least one monomer or their mixtures. Advantageously, the injection step has a duration of less than 15 seconds. Preferably, the duration of this step will be from 1 to 10 seconds. In the case of the use of a reactive composition, a short injection time makes it possible to limit the simultaneous or subsequent polymerization of the reactive composition during this step, which improves the impregnation of the fibers.

In a particular embodiment corresponding to the RTM, the injection of the polymer or of the reactive composition into the closed mold and the impregnation of reinforcing fibers are simultaneous. In this embodiment, after optional initial degassing, the injection and impregnation are carried out in the absence of degassing, that is no vacuum is applied in the vents of the degassing system.

According to another embodiment corresponding to the CRTM, the polymer or the reactive composition is injected into a mold comprising an open compression chamber, preferably in the absence of degassing during injection, after optional initial degassing, then the impregnation of the reinforcing fibers by the reactive composition is carried out during the compression induced by the closure of the compression chamber, in the absence of degassing during said compression, at a pressure exerted on the mold of preferably 10 to 70 bar, even more preferentially from 40 to 60 bar. This pressure improves the impregnation of the fibers by the reactive composition.

According to a particular embodiment using a reactive composition, the temperature applied in the mold during the polymerization step is greater than the melting temperature Tm of the prepolymers, preferably greater than at least 5° C.

According to another embodiment using a reactive composition, the polymerization temperature is greater than the melting temperature of the prepolymer having the highest melting temperature, preferably greater than at least 5° C.

Preferably, the matrix of the press is maintained at a constant temperature between 200 and 350° C., especially between 230 and 320° C., and more particularly between 250 and 320° C.

Step for Maintaining the Closure of the Mold

According to the reactive composition used, the duration of this step for maintaining the closure of the press will be dependent on the conversion rate of the prepolymers into polymers or of the monomers into prepolymers then into polymers. Preferably, the duration of this step corresponds to the time required to double the molecular weight of the prepolymers.

According to the reactive composition used, it is possible to envisage the fact that the polymerization is started during injection in the case of RTM or during injection-compression in the case of CRTM of the composition then continues during cooling. This embodiment makes it possible to reduce the time spent in the press and thus to considerably increase the production rate of parts without considerably increasing the cost.

During the maintaining step, degassing may be applied, preferably with a maintaining pressure less than 5 bar. This degassing may be carried out by applying a vacuum ranging from 0.010 to 0.950 bar, preferably from 0.700 to 0.900 bar, with respect to the atmospheric pressure. The vents of the system positioned on the mold have a sufficiently small diameter and the reactive composition is sufficiently viscous in order to create, at the vents, a pressure drop preventing the reactive composition from passing through the vents and exiting the mold.

Removing the Mold from the Press

The press is then opened. The thin-walled mold is then removed from the press. During these two steps, the thin-walled mold is maintained in the closed position by a vacuum facilitating a pressure of 0.700 to 0.900 bar.

Step of Maintaining the Closure of the Mold Outside of the Press and Cooling

The method then comprises a step of maintaining the closure of the mold outside of the press in order to optionally finish the polymerization of the polymer matrix from the reactive composition. This pressure is also called the "holding pressure". Advantageously, this pressure is less than the pressure applied during the impregnation step. In a particularly preferred manner, this pressure is greater than the saturated vapor pressure of water in the case of polycondensation. By "saturated vapor pressure of water", one understands the saturated vapor pressure of the dissolved water, in the matrix of the composite obtained after polymerization of the reactive composition, at the temperature at which said polymerization took place. Applying a holding pressure greater than the saturated vapor pressure of water prevents the water formed as a byproduct during polymerization from forming bubbles, which would degrade the quality of the composite material. Preferably, the pressure applied during the step of maintaining the closure is from 3 to 7 bar, even more preferentially from 4 to 6 bar.

According to a particular embodiment, the degassing is applied for substantially the entire duration of the step of maintaining the closure of the mold, that is outside the press. The pressure applied during the polymerization step must however be low enough so that the reactive composition does not pass through the vents during the application of degassing.

The duration of the step of maintaining the closure of the mold outside of the press depends on the kinetics of the polymerization of the reactive composition. This duration is preferably less than 15 minutes, preferably less than 10 minutes, more preferentially less than 5 minutes.

Cooling

The thin-walled mold is left to cool by thermal conduction with the surrounding air through its thin walls, by thermal conduction with a cold environment, in a cold room, or even in a cold forming machine, the surrounding temperature being able to reach a temperature less than the crystallization temperature (Tc) of the polymer formed.

According to another embodiment, the cooling consists of positioning the thin-walled mold in a so-called cold forming machine, regulated at a temperature less than or equal to the crystallization temperature Tc of the polymer formed under a residual pressure between 0.7 and 10 bar, preferably between 0.7 and 5 bar.

Advantageously, the cooling step is carried out with a cold forming machine.

Removal from the Mold

The composite material part is then removed from its thin-walled mold.

Fitting and Removal

According to a preferred embodiment of the invention, the steps for the fitting and removal from the thin-walled mold, before and/or after the step of injecting the polymer or the reactive composition, may be carried out using robotic arms. Indeed, for the method according to the invention making it possible to maintain the matrix of the press at a relatively high constant temperature, the use of robotic arms avoids any endangering of operators handling these machines.

As for the steps prior to placing the mold into the press, it is possible to use a circular device arranged on an axis of rotation allowing the transfer of molds from the press to, for example, the cold forming machine for the cooling step.

According to a particular embodiment of the invention, it is possible to envisage a single circular device, on which would be placed the molds comprising only the reinforcing fibers (before molding) and the molds comprising the composite material to be cooled (after molding).

Polymer Matrix

The composite material comprises reinforcing fibers and a polymer matrix.

According to one embodiment, the polymer matrix can be selected from:
- the polymers and copolymers from the family of aliphatic, cycloaliphatic or semi-aromatic polyamides (PA) (also called polyphthalamides (PPA)),
- the polyureas, in particular aromatic polyureas,
- the polymers and copolymers from the family of acrylics such as polyacrylates, and more particularly polymethyl methacrylate (PMMA) or derivatives thereof,
- the polymers and copolymers from the polyaryletherketone (PAEK) family like poly(etheretherketone) (PEEK), or poly(aryletherketoneketones) (PAEKK) like poly(etherketoneketone) (PEKK) or derivatives thereof,
- the aromatic polyether-imides (PEI),
- the polyarylsulfides, in particular polyphenyl sulfides (PPS),
- the polyarylsulfides, in particular polyphenylene sulfones (PPSU),
- the polyolefins, in particular polypropylene (PP),
- polylactic acid (PLA),
- polyvinyl alcohol (PVA),
- the fluorinated polymers, in particular polyvinylidene fluoride (PVDF), polytetrafluoroethylene (PTFE) or polychlorotrifluoroethylene (PCTFE), and mixtures thereof.

Preferably, the polymer matrix is selected from polyamide, polyester, polyamide-imide, polyamide-ether, polyacrylic, polyolefins, phenylene polysulfide, polyether-imide matrices.

According to one advantageous embodiment, the polymer matrix is a polyamide matrix.

According to one embodiment, the polymer matrix is a thermoplastic matrix.

According to a particular embodiment, the polymer matrix is a semi-crystalline matrix. A semi-crystalline polymer imparts to the composite material, in relation to amorphous polymers, significantly improved mechanical performances, in particular when hot, such as creep and fatigue resistance.

Advantageously, the polymer matrix has a glass transition temperature Tg of at least 80° C., preferably of at least 90° C., more preferentially of at least 100° C. and even more preferably of at least 120° C. A glass transition temperature greater than or equal to 80° C. ensures good mechanical properties for the composite over the entire temperature range of use, for example up to 90° C. for wind power, up to 100° C. for automotives and up to 120° C. for aeronautics.

According to an even more advantageous embodiment, the polymer matrix is semi-crystalline and has a melting temperature Tm greater than 200° C., preferably greater than 220° C. A melting temperature greater than 200° C. allows compatibility with cataphoresis treatments, in particular in the automotive industry. Preferably, the melting temperature Tm is less than or equal to 320° C. and even more preferentially less than 290° C. A melting temperature greater than 320° C. requires use of the composite material at higher temperatures, which imposes constraints on the molding material and the associated heating system and leads to overconsumption of energy. The use at such high temperatures increases the risks of thermal degradation of the polymer resulting in degradation of the properties of the final matrix and therefore of the composite material and the final composite part.

According to one embodiment, the polymer matrix has a crystallization temperature Tc such that the difference between the melting temperature Tm of the matrix and the crystallization temperature Tc, Tm-Tc, does not exceed 60° C., preferably does not exceed 50° C. and more particularly does not exceed 40° C.

According to one variant, the enthalpy of crystallization of the polymer matrix is between 10 to 55 J/g.

According to a particular variant, the enthalpy of crystallization of the polymer matrix is between 40 J/g to 55 J/g, preferably from 20 to 35 J/g.

The mechanical performance or the hot mechanical strength of the composite material may be assessed by the variation of the flexural rupture stress in the direction of the fibers (or "maximum strength at 0°") between the ambient temperature (23° C.) and 100° C., with good hot mechanical strength corresponding to maintenance of mechanical performance of at least 75%, in terms of rupture stress, with respect to those at ambient temperature (23° C.).

According to one embodiment of the invention, the polymer matrix is prepared by mass polymerization of the reactive composition comprising at least one prepolymer, at least one monomer or a mixture thereof, in the molten state.

Advantageously, the polymer matrix has a number average molar mass greater than 10 000 g/mol, preferably from 10 000 to 40 000 g/mol, even more preferentially from 12 000 to 30 000 g/mol.

According to one embodiment, the polymer matrix is a polyamide matrix which comprises units from the following monomers: terephthalic diacid, isophthalic diacid, adipic acid, sebacic acid, dodecanoic acid, 1,10-decamethylenediamine, 1,6-hexamethylenediamine, 2-methylpentamethylenediamine (MPMD), a mixture of 2,2,4 and 2,4,4-trimethylhexanediamine (TMD), 2-methyloctanediamine (8M), nonanediamine, 4,4'-diaminodicyclohexylmethane (PACM) m-xylylenediamine (MXD), 1,3-bis(aminomethyl)cyclohexane (1,3 BAC), 1,4-bis(aminomethyl)cyclohexane (1,4

BAC), caprolactam, 11-aminoundecanoic acid, 12-aminolauric acid and/or lauryl lactam.

According to an advantageous embodiment, the polymer matrix is a polyamide matrix that is selected from PA 11/10T, PA5T/10T, PA 11/5T/10T, PA 6T/10T, PA 11/6T/10T, PA MPMDT/10T, PA MDXT/10T, PA BACT/10T, PA 11/BACT, PA 11/BACT/10T, PA 6/6T, PA 66/6T, PA 6I/6T, PA MPMDT/6T, PA 6T/10T, PA 8MT/9T, PA TMDT/10T, PA PACM12, PA BACT/6T, PA 11/BACT/6T, PA BACT/10T/6T, PA MXD6 and PA MXD10, BAC being advantageously 1,3 BAC.

Reactive Composition

The reactive composition comprises one or several monomers likely to react by itself or with others or one or several prepolymers likely to react together during the polymerization step, to provide the matrix disclosed hereinbefore.

In an advantageous embodiment, the prepolymer(s) are polyamide prepolymers.

Each prepolymer is itself a polymer (homopolymer or copolymer), presenting a number average molar mass less than that of the matrix. According to one embodiment, the prepolymers included in the reactive composition have a number average molar mass from 500 to 10 000 g/mol, preferably from 750 to 6 000 g/mol, more preferentially from 750 to 3 000 g/mol.

According to one embodiment, when at least two prepolymers are used, these present substantially the same number average molar mass. By "substantially the same number average molar mass", it is meant that the difference between the two masses is less than 30%.

According to a first embodiment, the composition comprises at least a first polyamide prepolymer A1 bearing two amine functions and at least a second polyamide prepolymer A2 bearing two carboxyl functions coreactive with the amine functions of the first polyamide prepolymer. The backbones of the prepolymers A1 and A2 can be of the same nature (that is have the same composition in repeated units), or of a different nature. Preferably, they are of the same nature.

According to a second embodiment, the composition comprises at least one polyamide prepolymer A3 bearing an amine function and a carboxy function coreactive with each other. In this embodiment, the composition can comprise a single polyamide prepolymer bearing an amine function and carboxyl function coreactive with each other, or even several different prepolymers, each bearing an amine function and a carboxyl function. In this latter case, the backbones of the different prepolymers A3 can be of the same nature (the different prepolymers A3 thus being distinguished only by a distinct number average molar mass), or of a different nature.

According to a third embodiment, the composition comprises at least one prepolymer A1 bearing two amine functions (as disclosed hereinbefore) and at least one polyamide prepolymer A2 bearing two carboxyl functions (as disclosed hereinbefore).

According to a fourth embodiment, the composition comprises at least one prepolymer A1 bearing two amine functions (as disclosed hereinbefore) or at least one polyamide prepolymer A2 bearing two carboxyl functions (as disclosed hereinbefore) and least one chain extender of formula Y-A'-Y, wherein:
Y is a group bearing a reactive function by polyaddition or polycondensation with at least one function of said prepolymer A1 and/or A2;
A' is a hydrocarbon biradical.

When the prepolymer bears two NH$_2$ functions (amine functions):
either chain extender Y-A'-Y is such that
Y is chosen from groups: maleimide, optionally blocked isocyanate, oxazinone and oxazolinone, preferably oxazinone and oxazolinone and
A' is a carbon spacer or carbon radical selected from:
a covalent bond between two functions (groups) Y in the case where Y is an oxazinone or oxazolinone group, or
an aliphatic hydrocarbon chain or an aromatic and/or cycloaliphatic hydrocarbon chain, the latter two comprising at least one ring with 5 or 6 carbon atoms optionally substituted, with optionally said aliphatic hydrocarbon chain having a molecular weight of 14 to 200 g·mol$^{-1}$;
or the chain extender Y-A'-Y is such that Y is a caprolactam group and A' can be a carbonyl radical such as carbonyl biscaprolactam or A' can be a terephthaloyl or an isophthaloyl, or the diepoxides selected from aliphatic diepoxides, cycloaliphatic diepoxides or aromatic diepoxides optionally substituted.

Examples of aliphatic diepoxides include diglycidyl ethers of aliphatic diols, as aromatic diepoxides, diglycidyl ethers of bisphenol A such as bisphenol A diglycidyl ether (BADGE) and as cycloaliphatic diepoxides, diglycidyl ethers of cycloaliphatic diols or of hydrogenated bisphenol A. More generally, suitable examples of diepoxides according to the invention include bisphenol A diglycidyl ether (BADGE) and its hydrogenated derivative (cycloaliphatic), bisphenol F diglycidyl ether, tetrabromobisphenol A diglycidyl ether or hydroquinone diglycidyl ethers, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether with Mn<500, polypropylene glycol diglycidyl ether with Mn<500, polytetramethylene glycol diglycidyl ether with Mn<500, resorcinol diglycidyl ether, neopentylglycol diglycidyl ether, bisphenol A polyethylene glycol diglycidyl ether with Mn<500, bisphenol A polypropyleneglycol diglycidyl ether with Mn<500, dicarboxylic acid diglycidyl esters like the glycidyl ester of terephthalic acid or epoxidized diolefins (dienes) or fatty acids with double epoxidized ethylenic unsaturation, diglycidyl 1,2 cyclohexane dicarboxylate and mixtures of the diepoxides cited.
or said chain extender Y-A'-Y bear a cyclic anhydride group Y and preferably this extender is selected from a carboxylic cycloaliphatic and/or aromatic dianhydride and more preferentially is selected from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3',4,4'-benzophenone tetracarboxylic dianhydride, 1,2,3,4-cyclobutanetetracarboxylic dianhydride, hexafluoroisopropylidene bisphthalic dianhydride, 9,9-bis(trifluoromethyl)xanthenetetracarboxylic dianhydride, 3,3',4,4'-diphenylsulfonetetracarboxylic dianhydride, bicyclo[2.2.2]oct-7-ene-2,3,5,6-tetracarboxylic dianhydride, 1,2,3,4-cyclopentanetetracarboxylic dianhydride, 3,3',4,4'-diphenyl ether tetracarboxylic dianhydride or mixtures, A' being a carbon spacer (radical) as defined hereinbefore.

When the prepolymer bears two COOH functions (carboxy functions), said chain extender Y-A'-Y is such that:

Y is selected from the groups: oxazoline, oxazine, imidazoline or aziridine, like 1,1'-iso- or tere-phthaloyl-bis (2-methyl aziridine), or the diepoxides selected from the aliphatic diepoxides, cycloaliphatic diepoxides or aromatic diepoxides optionally substituted. Examples of aliphatic diepoxides include diglycidyl ethers of aliphatic diols, as aromatic diepoxides, diglycidyl ethers of bisphenol A such as bisphenol A diglycidyl ether (BADGE) and as cycloaliphatic diepoxides, diglycidyl ethers of cycloaliphatic diols or of hydrogenated bisphenol A. More generally, suitable examples of diepoxides according to the invention include bisphenol A diglycidyl ether (BADGE) and its hydrogenated derivative (cycloaliphatic), bisphenol F diglycidyl ether, tetrabromobisphenol A diglycidyl ether or hydroquinone diglycidyl ethers, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether with Mn<500, polypropylene glycol diglycidyl ether with Mn<500, polytetramethylene glycol diglycidyl ether with Mn<500, resorcinol diglycidyl ether, neopentylglycol diglycidyl ether, bisphenol A polyethylene glycol diglycidyl ether with Mn<500, bisphenol A polypropyleneglycol diglycidyl ether with Mn<500, dicarboxylic acid diglycidyl esters like the glycidyl ester of terephthalic acid or epoxidized diolefins (dienes) or fatty acids with double epoxidized ethylenic unsaturation, diglycidyl 1,2 cyclohexane dicarboxylate and mixtures of the diepoxides cited.

A' is a carbon spacer (radical) as defined hereinbefore.

In all of the statements hereinbefore, A' can especially represent an alkylene biradical such as —$(CH_2)_m$— with m ranging from 1 to 14 and preferably from 2 to 10 or a substituted or unsubstituted cycloalkylene and/or arylene biradical, such as benzene arylenes, such as o-, m-, p-phenylenes or naphthalenic arylenes.

According to one embodiment, the reactive composition is prepared by mixing at least two prepolymers.

Preferably, the method comprises a preliminary heating step of the prepolymer(s), up to a temperature greater than the melting temperature of the prepolymers. Preferably, the heating temperature applied is 200 to 350° C., especially from 230 to 320° C., and more particularly from 250 to 320° C.

Preferably, at least two prepolymers are used, in which case the method comprises a step of mixing prepolymers in the molten state, for example by means of a static mixer, a dynamic mixer, or a RIM ("Reactive Injection Molding") type mixer in order to form the composition intended to be injected into the mold.

The prepolymers (especially polyamides) may be prepared in a manner known to the skilled person by polymerization from respective monomers, the polymerization can be interrupted, when the desired molar mass is achieved, for example by checking the water pressure (progress of the reaction) and/or quantities of monomers. The prepolymers A1 and A2 bearing two amine functions or two carboxyl terminus functions can be obtained for example using an excess of diamine monomer, or an excess of diacid monomer.

The manufacture of such reactive prepolymers is for example disclosed in document WO 2014/064375.

Preferably, the prepolymers contained in the reactive composition and the polymer matrix obtained by polymerization of said reactive composition have the same composition in units from monomers a), b) and optionally c).

According to a particular embodiment, the prepolymers A1 and/or A2 or the prepolymer A3 comprise units from monomers: a) terephthalic acid, b1) 1,10-decamethylene diamine and b2) MPMD or MXD.

According to another particular embodiment, the prepolymers A1 and/or A2 or the prepolymer A3 comprise units from monomers: a) terephthalic acid, b1) 1,10-decamethylene diamine and b2) 1,3-bis(aminomethyl)cyclohexane (1,3 BAC), 1,4-bis(aminomethyl)cyclohexane (1,4 BAC) or a mixture thereof, in particular 1,3-bis(aminomethyl)cyclohexane (1,3 BAC).

According to another particular embodiment, the prepolymers A1 and/or A2 or the prepolymer A3 comprise units from the monomer c), this latter being selected from 11-aminoundecanoic acid, 12-aminolauric acid and lauryl lactam.

According to another more particular embodiment, the prepolymers A1 and/or A2 or the prepolymer A3 comprise units from monomers: a) terephthalic acid, b1) 1,10-decamethylenediamine, b2) 1,6-hexamethylenediamine or MPMD or MXD or 1,3 BAC or 1,4 BAC and c) 11-aminoundecanoic acid or 12-aminolauric acid or lauryl lactam.

According to an even more particular embodiment, the prepolymers A1 and/or A2 or the prepolymer A3 comprise units from monomers: a) terephthalic acid, b1) 1,10-decamethylenediamine, b2) 1,6-hexamethylenediamine or MPMD or MXD or 1,3 BAC or 1,4 BAC and c) 11-aminoundecanoic acid.

According to an even more particular embodiment, the prepolymers A1 and/or A2 or the prepolymer A3 comprise units from monomers: a) terephthalic acid, b1) 1,6-hexamethylenediamine, b2) MPMD or MXD or 1,3 BAC or 1,4 BAC and c) 11-aminoundecanoic acid.

According to an even more particular embodiment, the prepolymers A1 and/or A2 or the prepolymer A3 comprise units from monomers: a) terephthalic acid, b1) 1,10-decamethylenediamine, b2) 1,6-hexamethylenediamine and c) 11-aminoundecanoic acid.

According to another particular embodiment, the prepolymers A1 and/or A2 or the prepolymer A3 comprise units from monomers: a) terephthalic acid, b1) 1,10-decamethylenediamine, b2) 1,6-hexamethylenediamine and c) lauryl lactam.

According to an even more particular embodiment, the prepolymers A1 and/or A2 or the prepolymer A3 comprise units from monomers: a) terephthalic acid, b1) 1,6-hexamethylenediamine, b2) MPMD or MXD or 1,3 BAC or 1,4 BAC and c) lauryl lactam.

The reactive composition may also comprise monomers, said monomers being precursors of said prepolymers cited hereinbefore.

The reactive composition can comprise at least one carbon nanofiller. Preferably, the nanofiller is selected from: carbon black, graphenes, carbon nanofibrils and carbon nanotubes.

The reactive composition may comprise one or several other additives.

The additives may be an additive which absorbs UV, infrared (IR), microwave or induction radiation. Such an additive can be used to reheat the composite material or the preform or the composite material part, before for example, a complementary transformation operation, in particular thermostamping or overmolding.

The additives may also be a specific additive such as heat stabilizers, in particular these stabilizers are antioxidants against thermal oxidation and/or photo-oxidation of the polymer in the thermoplastic matrix and are organic or mineral stabilizers.

The expression "organic stabilizer" or more generally a "combination of organic stabilizers" denotes a primary antioxidant of the phenol type, a secondary antioxidant of the phosphite type, for example Doverphos® type liquid phosphites, and even optionally other stabilizers such as a HALS, which means Hindered Amine Light Stabilizer (for example Ciba's Tinuvin 770), an anti-UV (for example Ciba's Tinuvin 312), a phenol stabilizer or a phosphorus-based stabilizer containing. Amine antioxidants such as Crompton's Naugard 445 or even polyfunctional stabilizers such as Clariant's Nylostab S-EED may also be used.

The organic stabilizer present can be chosen, without this list being restrictive, from among:
phenol antioxidants, for example Ciba's Irganox 245, Irganox 1010, Irganox 1098, Ciba's Irganox MD1024, Great Lakes' Lowinox 44B25, Adeka Palmarole's ADK Stab AO-80,
phosphorus-based stabilizers, such as phosphites, for example Ciba's Irgafos 168,
a UV absorber, such as Ciba's Tinuvin 312 or titanium oxide $TiO_2$
a HALS, as previously stated,
an amine type stabilizer, such as Crompton's Naugard 445, or even a hindered amine type such as Ciba's Tinuvin 770,
a polyfunctional stabilizer such as Clariant's Nylostab S-EED.

A mixture of two, or more, of these organic stabilizers may obviously be envisaged.

The expression "mineral stabilizer" denotes a stabilizer containing copper or a metal oxide as disclosed in document US 2008/0146717. Examples of inorganic stabilizers include copper halides and acetates or iron oxides such as FeO, $Fe_2O_3$, $Fe_3O_4$ or a mixture thereof. Secondarily, other metals such as silver can optionally be considered, but these are known to be less effective.

These mineral stabilizers are more particularly employed, when the structures must have improved long-term heat resistance in hot air, in particular for temperatures greater than or equal to 100° C., or even greater than or equal to 120° C. because they tend to prevent breaks in polymer chains.

More particularly, "stabilizer containing copper" is understood to mean a compound comprising at least one copper atom, in particular in ionizable, or ionic form, for example in the form of a complex.

The stabilizer containing copper can be chosen from copper chloride, cuprous chloride, copper bromide, cuprous bromide, copper iodide, cuprous iodide, copper acetate and cuprous acetate. Mention may be made of halides, acetates of other metals such as silver in combination with the stabilizer containing copper. These copper-based compounds are typically associated with alkali metal halides, particularly potassium. A well-known example is the mixture of CuI and KI, where the CuI:KI ratio is typically between 1:5 to 1:15. An example of such a stabilizer is Ciba's Polyadd P201.

More details on stabilizers containing copper are found in document U.S. Pat. No. 2,705,227. More recently, stabilizers containing copper such as copper complexes such as Bruiggemann's Bruggolen H3336, H3337, H3373 have appeared.

Advantageously, the copper-based stabilizer containing is chosen from copper halides, copper acetate, copper halides or copper acetate in mixture with at least one alkali metal halide, and mixtures thereof, preferably mixtures of copper iodide and potassium iodide (CuI/KI).

The additive may also be an impact modifier, advantageously consisting of a polymer having a flexural modulus less than 100 MPa measured according to the ISO 178 standard and glass transition temperature Tg less than 0° C. (measured according to standard 11357-2:2013 near the inflection point of the DSC thermogram), in particular a polyolefin, coupled or not with a Peba (polyether block amide) having a flexural modulus <200 MPa.

The polyolefin of the impact modifier can be functionalized or non-functionalized or be a mixture of at least one functionalized polyolefin and/or least one non-functionalized polyolefin.

The additives may also be halogen-free flame retardants, such as those disclosed in document US 2008/0274355 and in particular a metal salt selected from a metal salt of phosphinic acid and a metal salt of diphosphinic acid, a polymer containing at least one metal salt of phosphinic acid, a polymer containing at least one metal salt of diphosphinic acid or red phosphorus, an antimony oxide, a zinc oxide, an iron oxide, a magnesium oxide or metal borates such as a zinc borate or melamine pyrophosphates and melamine cyanurates. They may also be halogenated flame-retardant agents such as a brominated or polybrominated polystyrene, a brominated polycarbonate or a brominated phenol.

Advantageously, the additive is chosen from an antioxidant, a heat stabilizer, a UV absorber, a light stabilizer, a shock modifier, a lubricant, an inorganic filler, a flame retardant agent, a nucleating agent, in particular a mineral filler such as talc, and a colorant.

Nanofillers and additives can be added to the polymer(s) or to the prepolymer(s) in the molten state to form the polymer or the reactive composition before the injection thereof into the mold.

Reinforcing Fibers

The reinforcing fibers used in the method according to the invention can be selected from mineral fibers, preferably glass, carbon or basalt fibers, in particular glass or carbon fibers or from synthetic fibers, preferably aramid fibers or polyaryletherketone fibers, or their mixtures.

Advantageously, the fibers have a length such that the L/D ratio is greater than 1,000, preferably greater than 2,000, L being the mean length of the fibers and D their mean diameter, determined by methods well known to the skilled person, particularly by microscopy.

The fibers can represent 45 to 80% by volume of composite material, preferably 50 to 70%.

Thin-Walled Mold

The purpose of the invention is also a mold comprising two parts, preferably of complementary shape, intended to be assembled, characterized in that it consists of
a first part comprising a groove around the entire edge of the part,
a second part comprising a protruding rib around the entire edge of the part, the positions of the groove and of the rib being selected so that they fit together when the mold is in the closed position,
at least one of the parts comprises at least one orifice, having a perpendicular axis to the surface of the part,
a seal is positioned in the groove of the first part,
the parts have a thickness that withstand a residual molding pressure greater than the saturated vapor pressure of water at the injection temperature of the reactive composition, the parts having heat conductive properties.

Preferably, the residual molding pressure that can be tolerated by the parts is between 0.7 to 5 bar.

The mold comprises orifices, having an axis perpendicular to the surface of the part. These orifices are commonly called injection points. They make it possible to inject the polymer or the reactive composition in the molten state inside the mold. The number of orifices in the part or the parts of the mold depends on the surface area of the part(s). The two parts of the mold, that is the lower part and the upper part may be provided with at least one injection point.

The mold may be equipped with a vacuum filling system making it possible to maintain it in the closed position, when it is not in the press. Preferably, the vacuum filling system enables a pressure of 0.7 bar to 0.9 bar.

The mold may be equipped with a mechanical system making it possible to maintain it in the closed position, when it is not in the press. This mechanical system makes it possible to withstand an internal pressure between 0.7 bar and 10 bar, preferably 0.7 and 5 bar.

According to one particular embodiment of the invention, the thin-walled mold is provided with a degassing system, that is a gas extraction system present in the enclosure of the mold, comprising at least one pump and one or several vents opening out onto the enclosure of the mold.

According to one particular embodiment of the invention, the first part comprising the groove and the seal is equipped with a cooling channel making it possible to cool the seal. This cooling channel can comprise a cold liquid, or even be connected to a cooling system using cold water or compressed air.

Preferably, the thin-walled mold is made of a heat-conducting material making it possible to conduct maximum heat from the press to the reactive composition injected in the molten state into the mold.

Preferably, the thermal conductivity ($\lambda$) of the walls is less than or equal to 10 W·m$^{-1}$·K$^{-1}$, preferably between 0.1 and 10 W·m$^{-1}$·K$^{-1}$, more particularly between 0.3 and 1 W·m$^{-1}$K$^{-1}$.

Thermal conductivity measurements of materials are done according to the HOT DISK technology such as described in the ISO 22007-2 standard.

According to a specific embodiment of the invention, the thin-walled mold is made from steel.

The mold may also comprise one of more means for gripping or catching, facilitating the easy handling of the mold.

Preferably, the mold according to the invention comprises:
- a first part comprising a groove around the entire edge of the part, a seal positioned in the groove and a cooling channel making it possible to cool the seal positioned in the groove of the first part,
- a second part comprising a protruding rib around the entire edge of the part, the positions of the groove and of the rib being selected so that they fit together when the mold is in the closed position,
- at least one of the parts comprises at least one orifice, having a perpendicular axis to the surface of the part,
- the parts being of a thickness that withstands a residual molding pressure greater than the saturated vapor pressure of water at the injection temperature of the reactive composition,
- the parts having heat conductive properties, the mold being provided with
- a degassing system and
- a vacuum filling system or a mechanical closing system.

Other goals, advantages and features will emerge from the following description given as a purely illustrative example and made with reference to the attached drawings in which:

FIG. 1 is a diagram of certain steps of the method according to the invention. The steps of injecting the polymer or the reactive composition: step 1A and cooling the thin-walled mold: step 1B are depicted therein.

According to the method according to the invention, a thin-walled mold containing reinforcing fibers is installed in a matrix mounted on a press. Step 1A depicts a press 12 comprising heating circuits 14 and means 13 for injecting the reactive composition. A thin-walled mold 11 receives the reactive composition in the molten state. The press is maintained in the closed position for all or part of the polymerization of the polymer matrix. The press is then opened. The thin-walled mold is removed. In step 1B, the thin-walled mold is positioned in a cold forming machine 15, comprising cooling circuits 16 in order to be cooled. The thin-walled mold is then removed.

FIG. 2 illustrates an embodiment of a thin-walled mold in accordance with the invention. The mold 1 is composed of the part 2, constituting the upper part of the mold 1 and of the part 3, constituting the lower part of the mold 1. The part 2 comprises a protruding rib 4 around the entire edge of the part. The part 2 also comprises two injection points 5 and 6, through which the polymer or the reactive composition is injected. The part 3 comprises a groove 7, present around the entire edge of the part 3. A seal 8 is positioned in the groove 7. The purpose of this seal is to ensure the sealing of the mold 1. The part 3 also comprises a cooling system in the vicinity of the seal 8 situated in the groove 7. The cooling system is used to extend the service life of the seals. A tube illustrated by the orifices 9 makes it possible to ensure the circulation of cold water or compressed air.

The invention also relates to the use of the thin-walled mold as disclosed hereinbefore for the manufacturing of a composite material.

The invention finally relates to a circular device arranged on an axis of rotation comprising several storage zones of identical shape, said shape being complementary to the shape of a part of a mold.

Other purposes and advantages of the present invention will become apparent from the following examples, which are not intended to be limiting.

EXAMPLES

Example 1 (Comparative)

A fibrous preform is introduced into a CRTM mold, installed on a press making it possible to apply a pressure of 50 bar on the mold.

The reactive composition used is a mixture of prepolymers PA 11/10T/6T with acid termination and PA11/10T/6T with amine termination, in a 50/50 ratio, with a molar mass of 2,500 g/mol and viscosity of 1 Pa·s at 300° C. The melting temperature of the prepolymers is 265° C. and the crystallization temperature of the final polymer is 230° C.

The thermal cycle applied for molding goes from 220° C. to 300° C., the thermal amplitude of the cycle is therefore 80° C. A plateau of 1 minute at 300° C. is carried out. The injection of prepolymers is carried out at 300° C., at the start of a 1-minute plateau. The desired cycle time is 2 minutes, which means that every 2 minutes, the part is removed from the mold and a new preform is inserted into the mold.

In other words, the prepolymers are injected at 300° C., the temperature is maintained at 300° C. for one minute, then the temperature of the press drops to 220° C., for a period of 30 seconds. The part is removed from the mold. Then the temperature of the press rises again to 300° C., for a period of 30 seconds, to carry out another cycle.

The part, whose shape is presented in FIG. 3, has therefore been designed in a press incorporating a heating and cooling system allowing molding in 2 minutes with a cycle having a thermal amplitude of 80° C.

A power of 250 kW for heating and 160 kW for cooling are required to carry out this cycle.

Further, molding tests using a preform instrumented with thermocouples have shown that the temperature control from one point to another of the mold is very unsatisfactory and that a difference of more than 20° C. can be observed from one point to the other of the mold during the thermal cycle. Thus, the thermal steady state is never reached in the mold. Furthermore, the thermal cycle is too rapid to reach thermal equilibrium.

Moreover, samples have been taken in different locations of the molded composite part and molar mass measurements have been carried out by NMR (see Table 1).

FIG. 3 depicts a perspective view of a molded part 30 according to example 1. The positions 31, 32 and 33 represent the locations at which the analyzed samples have been taken. The results show, that the molar masses are different in these different Thus, the temperature variations encountered from one point to the other of the mold lead to differences in the progress of the polymerization reaction in situ.

Finally, it has been observed that the crystallization of the resin in the composite is not complete, which results in enthalpy of crystallization of 17 kJ/mol on average compared to 32 kJ/mol for this type of polymer when it is completely crystallized, measured by DSC. This difference between the values of crystallization enthalpy can be explained by the too high cooling speed applied to the mold, in order to be able to respect the 2-minute cycle time. Furthermore, the temperature variations from one point to another of the mold result in variations in the crystallization of the resin (see Table 1).

Example 2 According to the Invention

Fibrous is introduced into a 3-mm thick thin-walled steel CRTM mold, positioned outside the press. This mold is then closed and kept closed by means of a vacuum filling system composed of a pump and a pipe connected to several vents positioned all around the preform. The thin-walled mold is then transferred to a matrix pre-heated to 300° C., installed on a press. After a holding time of 30 seconds, the temperature of the thin-walled mold reaches the temperature of the heating matrix. The reactive composition used is the same as that disclosed in example 1. The reactive composition is then injected in 5 seconds into the compression chamber of the thin-walled mold. Using the press, a pressure of 50 bar is applied to the mold, which makes it possible to close in 5 seconds, said compression chamber and to impregnate the fibrous preform.

After the compression phase, the temperature is maintained for 1 minute at 300° C., then the pressure is reduced to 5 bar and the vacuum is recreated. The press opens and the thin-walled mold is removed from the heating matrix by means of a robotic arm, then deposited in a carousel which rotates until a second thin-walled mold only comprising the glass fiber preform is positioned in the vicinity of the press, then positioned in the heating matrix, in place of the first mold, to receive the reactive composition. The carousel has 5 positions for the molds.

The cycle time is 2 minutes: 30 seconds of heating of the thin-walled mold+1 minute maintaining the polymerization time of the press and impregnation of the glass fibers+30 seconds of handling time for loading and unloading the mold.

The first thin-walled mold is then removed from the carousel by means of a robotic arm and positioned in a cold forming machine. This latter is maintained at the temperature of 220° C., which makes it possible to cool the thin-walled mold. This forming machine makes it also possible to apply a residual pressure of 5 bar throughout the cooling phase of the thin-walled mold. Once the thin-walled mold reaches the temperature of 220° C., which occurs after a cooling period of 10 minutes, it is then removed from the cold forming machine then opened and the composite part is removed from the mold.

The energy cost of this molding cycle is divided by 10 with respect to the cycle disclosed in example 1.

The crystallization time of the resin during cooling is considerably extended, while conserving a similar cycle time, which results in better polymerization and better crystallization of the resin (see Table 1).

The temperatures recorded from one point to the other of the mold and the thermal calculations indicate a variation of +/−2° C., which is very close to the variations obtained for a purely isothermal mold.

The samples of the composite material prepared in zones 31, 32 and 33 indicated in FIG. 3, make it possible to observe a similar progress regarding the polymerization reaction: a similar molar mass, at any point of the mold and good homogeneity of the crystallization (see Table 1).

| Type of molding | Sampling point | Molar mass (Mn, g/mol) | Enthalpy of crystallization (kJ/g) |
|---|---|---|---|
| Example 1 (comparison) | 31 | 9,000 | 13 |
|  | 32 | 12,500 | 20 |
|  | 33 | 11,200 | 18 |
| Example 2 (invention) | 31 | 18,000 | 30 |
|  | 32 | 19,100 | 32 |
|  | 33 | 18,600 | 31 |

[Table 1]: Molar mass measurements by NMR and crystallization by DSC, in zones 1, 2 and 3 of the part, for the 2 types of molding cycle.

The invention claimed is:
1. A method for manufacturing a part made of composite material, said material comprising reinforcing fibers and a polymer matrix, the method comprising the following successive steps:
   installing into a matrix mounted on a press a closed thin-walled mold wherein reinforcing fibers have been arranged,
   closing the press,
   injecting in the molten state into the closed thin-walled mold a polymer or a reactive composition comprising at least one prepolymer, at least one monomer or their mixture,
   maintaining the closing of the press for all or part of the polymerization of the polymer matrix, when a reactive composition is used,
   opening the press, removing the thin-walled mold from the press, while maintaining a residual pressure between 0.7 and 10 bar, in said mold, cooling the mold under said residual pressure, wherein the cooling step consists in positioning the thin-walled mold in a cold forming machine regulated at a temperature less than or equal to the crystallization temperature of the polymer formed under a residual pressure between 0.7 and 10 bar.

2. The method according to claim 1, the thin-walled mold being made of a heat-conducting material.

3. The method according to claim 1, wherein the thin-walled mold is provided with a vacuum filling system facilitating a pressure of 0.7 bar to 0.9 bar.

4. The method according to claim 1, wherein the matrix of the press is maintained at a constant temperature between 250° C. and 320° C.

5. The method according to claim 1, wherein after the cooling step, the method comprises a demolding step of the composite material from the thin-walled mold.

6. The method according to claim 1, wherein when the injection step is carried out with a reactive composition, then the polymerization of the reactive composition is carried out in the presence of degassing.

7. The method according to claim 1, wherein the step for maintaining the closure of the press for all or part of the polymerization is carried out with compression of the mold.

8. The method according to claim 1, wherein the polymer matrix is selected from polyamide, polyester, polyamide-imide, polyamide-ether, polyacrylic, polyolefin, phenylene polysulfide, polyether-imide matrices.

9. The method according to claim 1, wherein said reinforcing fibers are selected from mineral fibers, or from synthetic fibers or from the mixtures thereof; and/or in which the reinforcing fibers have an L/D ratio greater than 1,000, L being the mean length of the fibers and D their mean diameter.

10. The method according to claim 1, wherein a thermal conductivity of the thin-walled mold is at least 0.1 $W \cdot m^{-1} K^{-1}$.

11. The method according to claim 1, wherein a thermal conductivity of the thin-walled mold is at least 0.3 $W \cdot m^{-1} K^{-1}$.

* * * * *